United States Patent
Kamishio

(10) Patent No.: US 6,917,850 B2
(45) Date of Patent: Jul. 12, 2005

(54) MOTION DATA COMMAND SYSTEM AND CONTROL SIGNAL DEFINITION SYSTEM FOR MOTION PROGRAM

(75) Inventor: Tomohiro Kamishio, Fukuoka (JP)

(73) Assignee: Kabushiki Kaisha Yaskawa Denki, Fukuoka (JP)

(*) Notice: Subject to any disclaimer, the term of this patent is extended or adjusted under 35 U.S.C. 154(b) by 20 days.

(21) Appl. No.: 10/452,931

(22) Filed: Jun. 3, 2003

(65) Prior Publication Data

US 2004/0044433 A1 Mar. 4, 2004

(30) Foreign Application Priority Data

Jun. 4, 2002 (JP) .................................... P.2002-162264

(51) Int. Cl.[7] .............................................. G06F 19/00
(52) U.S. Cl. ........................ 700/180; 700/83; 345/474
(58) Field of Search ................................. 700/180–181, 700/186, 83, 84, 61, 245; 345/474

(56) References Cited

U.S. PATENT DOCUMENTS

| 6,714,201 B1 * | 3/2004 | Grinstein et al. ........... 345/474 |
| 2003/0069998 A1 * | 4/2003 | Brown et al. ............... 709/310 |
| 2003/0139848 A1 * | 7/2003 | Cifra et al. ................. 700/245 |

* cited by examiner

*Primary Examiner*—Leo Picard
*Assistant Examiner*—Zoila Cabrera
(74) *Attorney, Agent, or Firm*—Sughrue Mion, PLLC

(57) ABSTRACT

A motion data command system for a motion program having a numerical controller for controlling a servo amplifier in accordance with a given motion command. A memory is provided in the numerical controller for storing as variables motion command data. A motion API called by an application program on a personal computer is provided which gives a motion command via a bus to the numerical controller; and indirectly specifying the address of a variable of motion command data present in the memory by way of said motion API.

8 Claims, 4 Drawing Sheets

MOTION DATA COMMAND SYSTEM AND CONTROL SIGNAL DEFINITION SYSTEM FOR MOTION PROGRAM

BACKGROUND OF THE INVENTION

The present invention relates to a numerical controller used to control a machine tool, automatic assembly apparatus and an automatic carrier, and in particular to a method for executing a motion program assumed when the execution environment for the motion program is located outside the numerical controller, such as an a personal computer or a programmable controller.

The invention also relates to a numerical controller used to control a machine tool, automatic assembly apparatus and an automatic carrier, and in particular to a method for defining a control signal for controlling activation/termination of a motion program.

For a conventional art numerical controller whose motion program execution environment exists externally, in case motion command data used for the motion program is a variable, the location of the variable is the location where the execution environment for the motion program exists, that is, in an application program in a personal computer or in a programmable controller external to the numerical controller.

Such a related art will be described based on drawings. FIG. 3 is a block diagram of a system which executes a related art motion data command method. In the figure, a numeral 1C represents a personal computer or programmable controller, 2C an application program for motion command operating on the personal computer or programmable controller, 3C a specific example of an application program for a motion command, 18C a variable storage memory for storing motion command data, 4C a motion API (Application Programming Interface) called by the application program for a motion command, 5C a bus interface for accessing a bus 21C such as a PCI bus, 19C an application program for a sensor operating on the personal computer or programmable controller, 20C a specific example of the application program for a sensor 19C, 91C a sensor API called by the application program for a sensor 19C, 9Ca sensor interface for input from a sensor 17C, 6C a numerical controller, 7C a bus interface for accessing the bus 21C such as a PCI bus, 8C a motion control processor operating in accordance with given motion command data, 13C a servo amplifier, 14C a servo motor, 15C an encoder, and 16C a motion mechanism.

In the example of the application program 3C in FIG. 3, in steps (1) and (2), the initial values of motion command data are substituted into the variables X, Y present in the variable storage memory 18C in the personal computer or programmable controller 1C.

In step (3), a motion command API whose arguments are variables X, Y is called and a motion command is given to the numerical controller 6C. In this practice, the variables X, Y are converted to immediate values when the motion command API is called. Immediate motion command data is given to the numerical controller 6C. The motion control processor 8C, receiving an immediate motion command, uses the immediate values given to perform motion control.

Then, on an input from the sensor 17C, the input values or values selected by the input values are substituted into the variables X, Y in the variable storage memory 18C by way of the application program for a sensor 18C operating on the personal computer or programmable controller 1C. In FIG. 3, steps (6) through (9) in the specific example 20C are programs to perform this operation.

The application program for a motion command 2C detects that the values of the variables X, Y have been modified in step (4) in the specific example 3C, and uses the modified values of the variables X, Y to call the motion command API whose arguments are variables X, Y again and gives a motion command to the numerical controller 6C.

Next, a second conventional art will be described. According to this example, the I/O for a control program for controlling activation/termination is handled with a control signal definition tool on a personal computer or dedicated engineering tool.

The conventional art technology will be specifically described based on drawings. FIG. 4 is a block diagram of a system which executes a control signal definition method in the related art motion program. In the figure, a numeral 1D represents a personal computer or dedicated engineering tool, 22D I/O definition data for the control signal which defines the association of the operation of activation/termination of the motion program and I/O signals, 24D a specific example of the I/O definition data for the control signal, 23D a tool for setting the I/O definition data for the control signal, 2D a motion program under editing, 3D a specific example of a motion program, 4D a tool for editing the motion program, 5D and 7D communications interfaces for downloading data from a personal computer or dedicated engineering tool 1D to a numerical controller 9, 8D a data storage memory, 82D I/O definition data for the control signal stored in the data storage memory, 81D a motion program stored in the data storage memory, 9D an I/O interface for input/output of an I/O signal, 12D an I/O for the control signal, 11D a motion control processor operating in accordance with the given motion program, 13D a servo amplifier, 14D a servo motor, 15D an encoder, and 16D a motion mechanism.

In the example of the application program 3D in FIG. 4, insteps (1) through (3), a motion command API whose arguments are the variables X1 through X3 and Y1 through Y3 is called and a motion command is given to the numerical controller 9. In this practice, signals for controlling activation/termination of each motion command API are uniformly controlled by a single control command defined in the I/O definition data for the control signal. Thus a control signal cannot be selected individually.

In this way, in the conventional art, in case the value of a variable has changed due to an external cause such as an input signal to a sensor, a motion API must be called by an application program again and a command must be given via a bus such as a PCI bus. This prevents high-speed change of motion operation.

Another problem is that, on top of cumbersome definition of an I/O for the control signal, operation of a multi-series motion programs requires definition of the I/O for the control signal for each series as well as definition on which series the motion program belongs to. This complicates the preparatory stage of a motion program, thus turning the motion program hard to handle.

SUMMARY OF THE INVENTION

The invention has been accomplished in view of the aforementioned problems and aims at providing a system with a simple, easy-to-use preparatory stage which allows quick change of motion operation.

According to the invention, variables representing speeds and positions are stored in a memory in a numerical controller. The handles to a variable (address of the variable) are set to integers of a motion API called by an application program and sensor input and values of variables are changed by the numerical controller so as to change motion operation at high speed.

Further, by providing on a motion program an API which performs definition of the I/O for the control signal for control of activation/termination of a motion program, a tool for defining the I/O of the control signal is no longer required, thus readily providing the operation of a multi-series motion program.

DESCRIPTION OF THE PREFERRED EMBODIMENT

Figure 1:
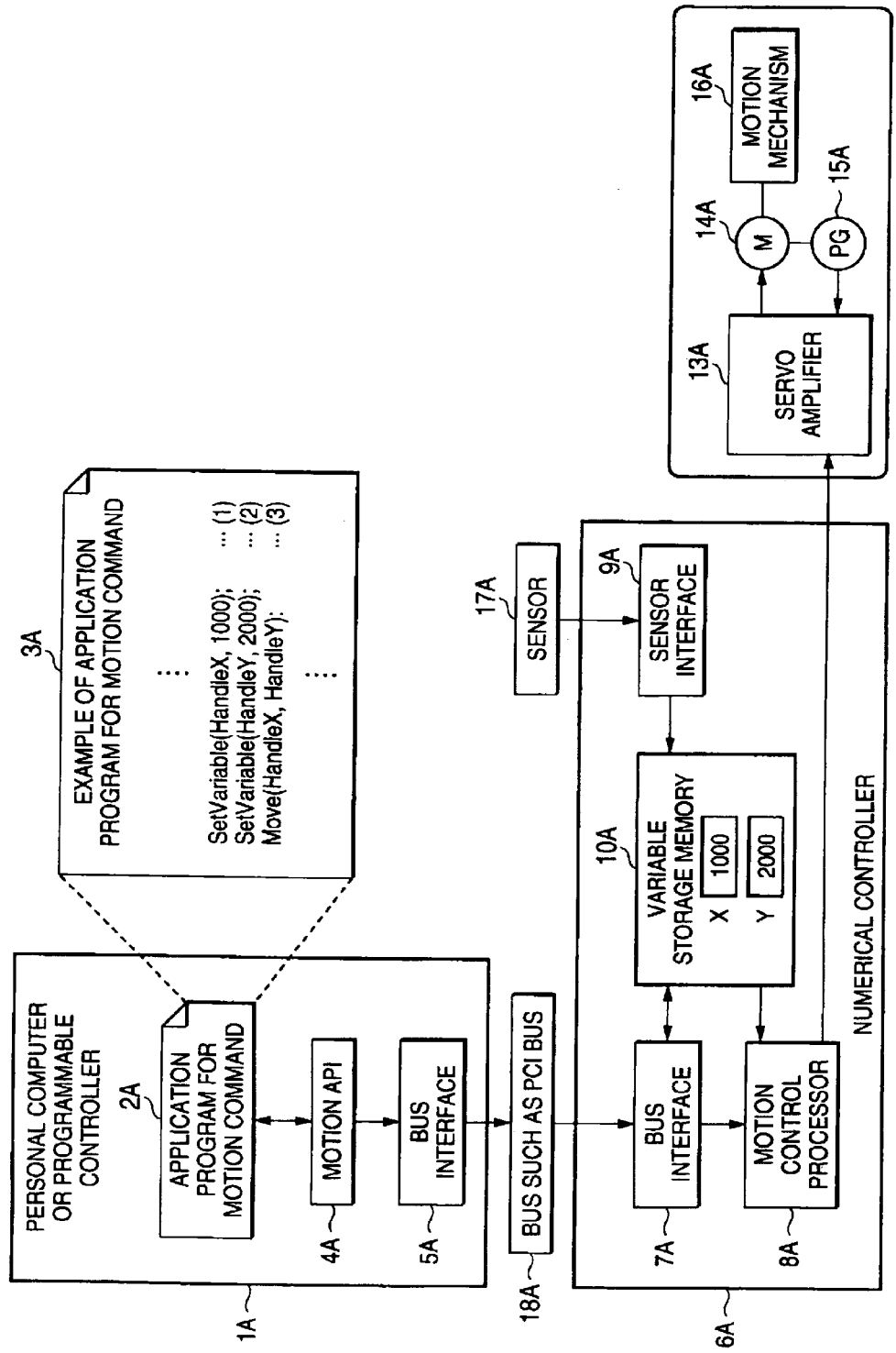
FIG. 1 is a block diagram of a motion data command system according to the invention.

Embodiments of the invention will be described based on drawings. FIG. 1 is a block diagram of a system which executes a motion data command method according to the first embodiment of the invention. In the figure, a numeral 1A represents a personal computer or programmable controller, 2A an application program for a motion command operating on the personal computer or programmable controller 1A, 3A a specific example of an application program for a motion command, 4A a motion API called by the application program 2A, 5A and 7A bus interfaces for accessing a bus 18A such as a PCI bus, 6A a numerical controller, 8A a motion control processor operating in accordance with given motion command data, 9A a sensor interface for input from a sensor 17A, 10A a variable storage memory for storing motion command data, 13A a servo amplifier, 14A a servo motor, 15A an encoder, and 16A a motion mechanism.

In the specific example 3A of the application program 2A in FIG. 1, in steps (1) and (2), the initial values of motion command data are substituted into the variables X, Y present in the memory 10A in the numerical controller 6A. In this practice, it is not possible to directly substitute values into the variables X, Y from the application program 2A. Thus, the handles Handle-X, Handle-Y to specify the variables X, Y are introduced and the data setting API which employs these handles as arguments is used to substitute the initial values of motion command data.

In step (3), the handles Handle-X, Handle-Y to specify the variables X, Y are introduced and the motion command API which employs these handles as arguments is called to give a motion command to the numerical controller 6A.

The motion control processor 8A, receiving a motion command, uses the values stored in the variables X, Y present in the variable storage memory 10A indicated by Handle-X, Handle-Y to perform motion control.

Then, an input is made from the sensor 17A and the input values or values selected by the input values are substituted into the variables X, Y in the variable storage memory 10A by way of the sensor interface 9A. At this point in time, the motion control processor 8A is capable of changing motion control by using the values stored in the variables X, Y present in the variable storage memory 10A, without using an application program and communications with the application program.

Figure 2:
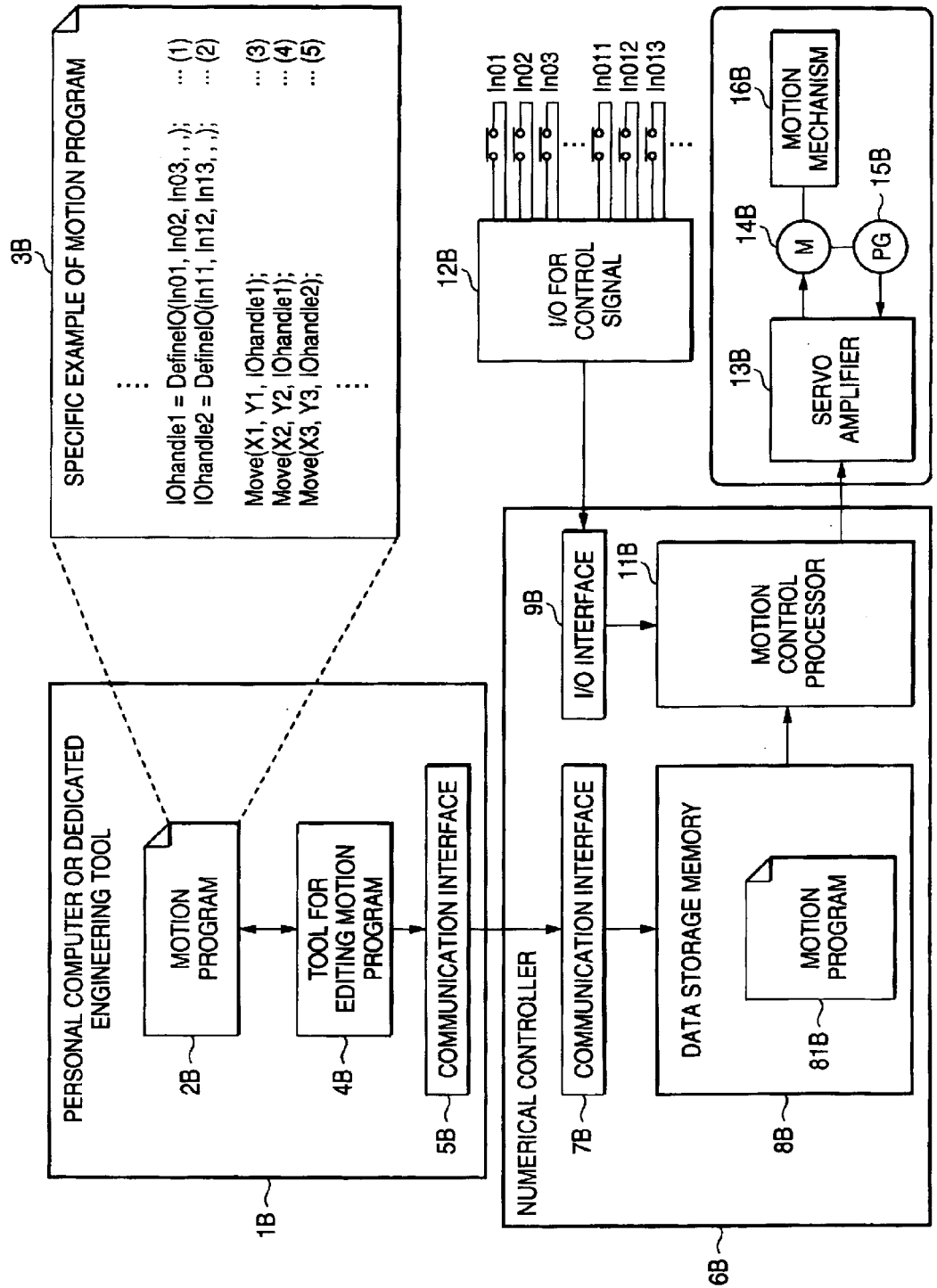
FIG. 2 is a block diagram of a control signal definition system in a motion program according to the invention.
Figure 3:
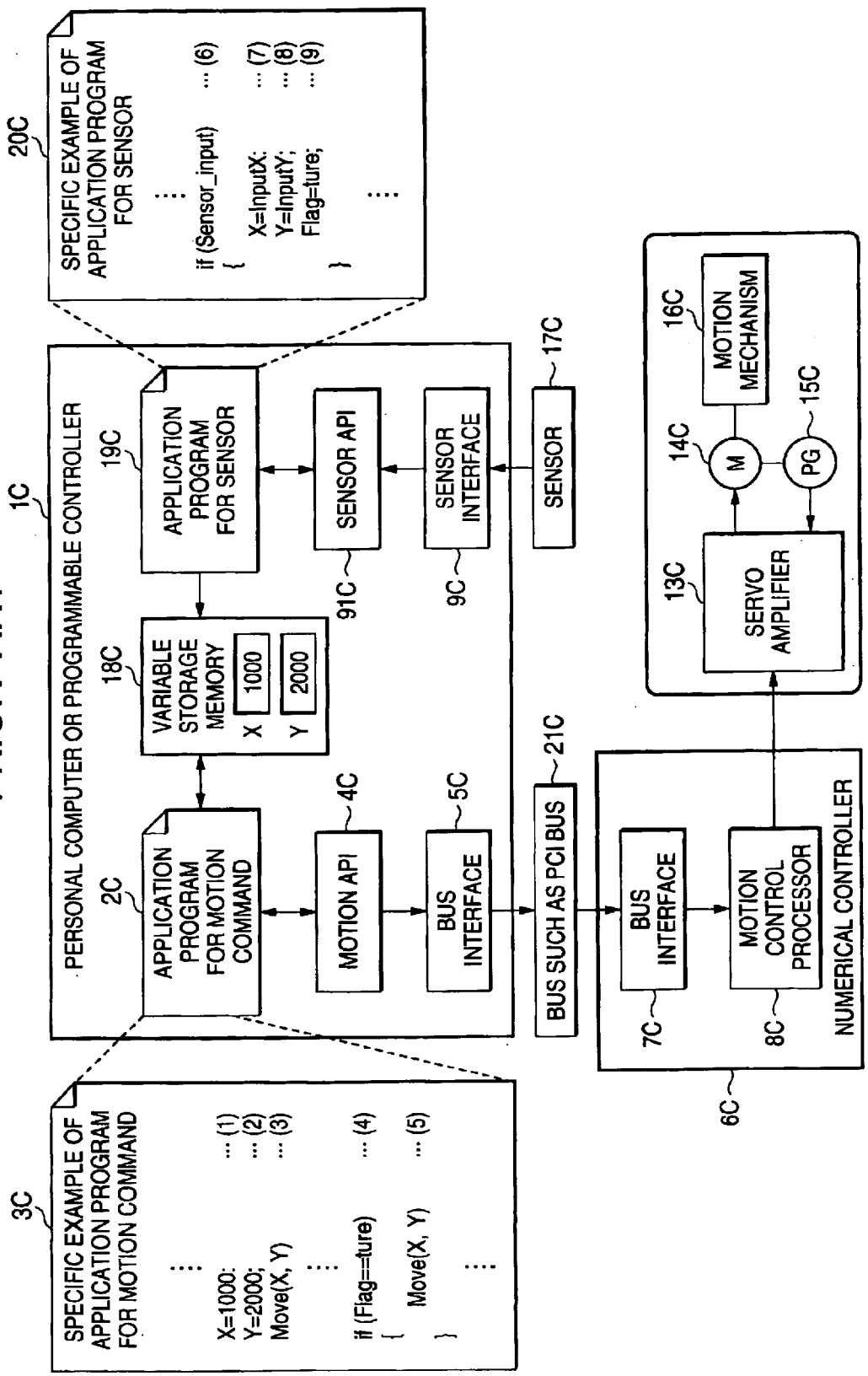
FIG. 3 is a block diagram of a related art motion data command system.
Figure 4:
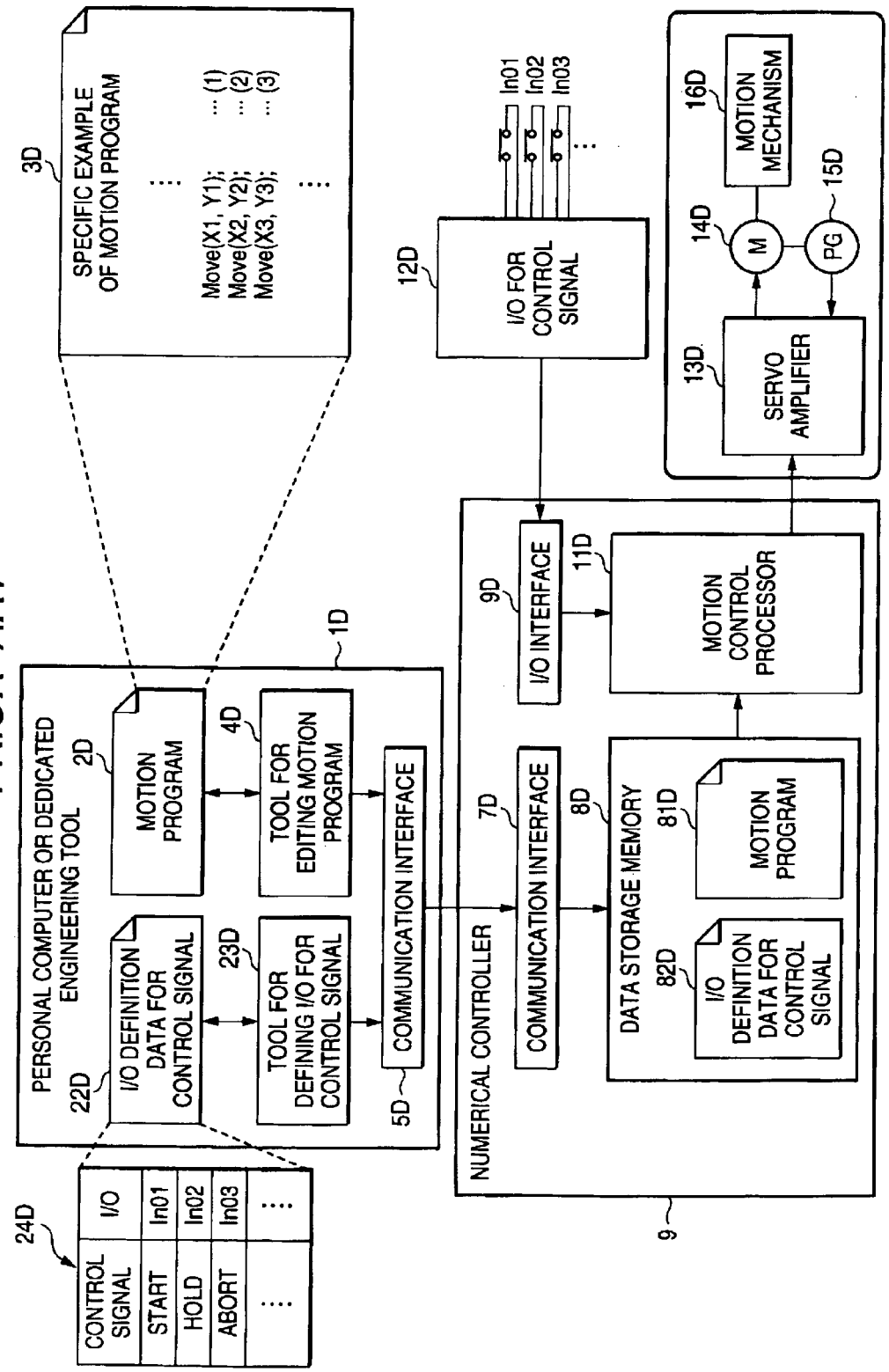
FIG. 4 is a block diagram of a control signal definition system in a related art motion program.

The second embodiment of the invention will be described based on drawings. FIG. 2 is a block diagram of a system which executes a control signal definition method in the motion program according to the invention. In the figure, a numeral 1B represents a personal computer or dedicated engineering tool, 2B a motion program under editing, 3B a specific example of a motion program, 4B a tool for editing the motion program 2B, 5B and 7B communications interfaces for downloading data from a personal computer or dedicated engineering tool 1B to a numerical controller 6B, 8B a data storage memory, 81B a data storage motion program, 9B an I/O interface for input/output of an I/O signal, 12B an I/O for the control signal, 11B a motion control processor operating in accordance with the given motion program 2B, 13B a servo amplifier, 14B a servo motor, 15B an encoder, and 16B a motion mechanism.

According to one specific example 3B of the application program 2B in FIG. 2, in step (1), an API whose arguments are In01 through In03 as control signal I/Os is called and association with the operation of activation/termination of the motion program is provided to obtain the control signal handle IOhandle1. In the motion program 2B, an API whose arguments are In11 through In13 as control signal I/Os is called and association with the operation of activation/termination of the motion program is provided to obtain the control signal handle IOhandle2.

In steps (3) and (4), the control signal handle IOhandle1 is used to call a motion command API which uses this handle as an argument to perform motion control. In step (5), the control signal handle IOhandle2 is used to call a motion command API which uses this handle as an argument to perform motion control.

As mentioned hereabove, according to the first embodiment of the invention, the handles to a variable (address of the variable) are set to integers of a motion API called by an application program, the variables of the motion API stored in the memory of a numerical controller. Thus, even in case the value of a variable has changed due to an external cause such as an input signal to a sensor, it is not necessary to give a command again from an application program via a bus such as a PCI bus, thereby changing motion operation at high speed.

Further, according to the second embodiment of the invention, by providing on a motion program an API which performs definition of the I/O for the control signal for controlling activation/termination of the motion program, a tool for defining the I/O of the control signal is no longer required, thus allowing selection of an individual control signal per motion command. Further, definition of separate control signals in a plurality of programs readily provides the operation of a multi-series motion program.

What is claimed is:

1. A motion data command system for a motion program comprising:

a numerical controller for controlling a servo amplifier in accordance with a given motion command;

a memory in the numerical controller for storing as variables motion command data;

a motion API called by an application program on a personal computer and gives a motion command via a bus to the numerical controller; and means for indirectly specifying the address of a variable of motion command data present in the memory by way of said motion API.

2. The motion data command system of claim 1 wherein said motion data command is one of a speed and a position.

3. The motion data command system of claim 1 wherein said bus is a PCI bus.

4. A motion data command system for a motion program comprising:
  a numerical controller for controlling a servo amplifier in accordance with a given motion command;
  a memory in the numerical controller for storing as variables motion command data;
  a motion API called by an application program on a higher-order programmable controller and gives a motion command via a bus to the numerical controller; and
  means for indirectly specifying the address of a variable of motion command data present in the memory by way of said motion API.

5. The motion data command system of claim 4 wherein said motion data command is one of a speed and a position.

6. The motion data command system of claim 4 wherein said bus is a PCI bus.

7. A control signal definition system for a motion program comprising:
  a motion program editing tool on a personal computer;
  a numerical controller for controlling a servo amplifier in accordance with a given motion program;
  a memory in the numerical controller for storing as variables motion command data;
  means for indirectly specifying the address of a variable of motion command data present in the memory by way of said motion API;
  an I/O for the control signal for controlling activation/termination of the motion program; and
  means for defining the association of the operation of activation/termination of the motion program and I/O signals on the motion program.

8. The motion data command system of claim 7 wherein said motion data command is one of a speed and a position.

* * * * *